United States Patent [19]

Kageyama et al.

[11] 4,367,314
[45] Jan. 4, 1983

[54] RESIN COMPOSITION

[75] Inventors: Akira Kageyama; Iwao Maekawa; Isao Uchigasaki, all of Hitachi; Takeshi Tanno, Chiba, all of Japan

[73] Assignee: Hitachi Chemical Company, Ltd., Tokyo, Japan

[21] Appl. No.: 222,689

[22] Filed: Jan. 5, 1981

[30] Foreign Application Priority Data

Jan. 11, 1980 [JP] Japan .................................. 55/2318

[51] Int. Cl.$^3$ ......................... C08F 8/00; C08L 67/06
[52] U.S. Cl. .................................. 525/168; 525/166; 525/170
[58] Field of Search ...................... 525/166, 168, 170; 528/298

[56] References Cited

U.S. PATENT DOCUMENTS 4,029,848 6/1977 Nelson .................................. 428/430
4,100,224 7/1978 Hess et al. ............................ 525/166
4,228,251 10/1980 Maekawa et al. ................... 525/166
4,233,423 11/1980 Curtis, Jr. ............................ 528/298

Primary Examiner—J. Ziegler
Attorney, Agent, or Firm—Gordon W. Hueschen

[57] ABSTRACT

A setting resin composition, comprising:
(A) an unsaturated polyester having at least 30% of all the terminal groups thereof sealed each with a group represented by the general formula (I):

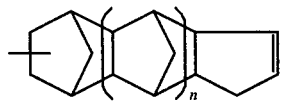

(I)

wherein, n stands for an integer of 0 to 8, and
(B) a dicyclopentadiene type resin containing 50 to 100% by weight of polymerized dicyclopentadiene units.

16 Claims, No Drawings

RESIN COMPOSITION

BACKGROUND OF THE INVENTION

1. Field of the Invention

This invention relates to a novel resin composition, and more particularly to a radically setting resin composition which sets with moderate shrinkage and possesses excellent adhesiveness and electrical properties.

2. Description of Prior Arts

Unsaturated polyester resins are less viscous and, therefore, easier to handle than epoxy type resins and other similar resins. Moreover, they quickly set even at normal room temperature and atmospheric pressure. Further, the products they form on setting possess fine properties. The resins, therefore, are used in large quantities in various fields.

Despite such beneficial properties, the unsaturated polyester resins have a disadvantage that they substantially exhibit heavy shrinkage during the setting. This difficulty stands on the way to further expansion of their use. To remedy the difficulty, methods for mitigating the heavy shrinkage of unsaturated polyester resins by incorporation therein of thermoplastic polymers have been developed and accepted for actual use in some fields. Generally, unsaturated polyester resins and thermoplastic polymers are not fully compatible with each other. When they are mixed, the thermoplastic polymers begin to separate from the polyester resins in a relatively short period of time. These methods, therefore, pose a problem that the combination fails to produce compositions capable of retaining the constituent parts stably mixed.

In terms of adhesiveness, unsaturated polyester resins are decidedly inferior to epoxy type resins, phenol resins, etc. In the circumstances, methods aimed at improving their adhesiveness as by incorporating a dicyclopentadiene structure into their unsaturated polyester backbones or modifying unsaturated polyesters with a xylene-formaldehyde resin have been proposed. These methods, however, have fallen short of producing the effects aimed at.

Further, Japanese Laid-open Patent Publication No. 60,984/1978 discloses a resin composition comprising an unsaturated polyester resin and a dicyclopentadiene type thermoplastic polymer in order to decrease setting shrinkage and improve adhesiveness. However, it was difficult to attain higher adhesiveness which is one of the object of the present invention by such method. It is thought that the reason is based on the following reasons: Dicyclopentadiene skeleton which is deemed to contribute increasing adhesiveness is introduced as a thermoplastic polymer, so the amount is limited; and it is apt to set heterogeneously, so the skeleton are localized in the set product. Furthermore, according to the above method, it was necessary to decrease the amount of the dicyclopentadiene skeleton in the thermoplastic polymer and also decrease the molecular weight of the polymer in order to enhance the compatibility, because the method can attain low compatibility.

An object of the present invention, accordingly, is to provide a curable resin composition which sets with moderate shrinkage and possesses high adhesiveness and electrical properties.

SUMMARY OF THE INVENTION

The object of this invention described above is accomplished by a curable resin composition which comprises:

(A) an unsaturated polyester having at least 30% of all the terminal groups thereof sealed each with a group represented by the formula (I):

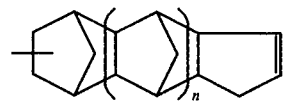

(I)

wherein, n stands for an integer of 0 to 8, and (B) a dicyclopentadiene type resin containing 50 to 100% by weight of polymerized dicyclopentadiene units. This resin composition may optionally incorporate therein (C) at least one polymerizable monomer having at least one polymerizable double bond within the molecular thereof. Again (D) optionally, it may further incorporate therein a thermoplastic polymer having a molecular weight within the range of from 5,000 to 500,000.

PREFERRED EMBODIMENT OF THE INVENTION

The unsaturated polyester (A) to be used in the present invention is required to have at least 30% of all the terminal groups thereof sealed each with a group represented by the general formula (I):

(I)

wherein, n stands for an integer of 0 to 8, preferably 0. Preferably, the proportion of the terminal groups sealed each with the group of the general formula (I) falls within the range of from 60 to 100%. When the proportion of the groups of the general formula (I) to all the terminal groups present is less than 30%, the unsaturated polyester imparts, to the produced resin composition, adhesiveness falling short of the level aimed at and shows deficient compatibility with the dicyclopentadiene type resin to be used as the second constituent part of the resin composition and, therefore, the unsaturated polyester constituent within the resin composition tends to cause phase separation while the resin composition is kept in storage. Any lower percentage than 30%, therefore, proves improper for this invention.

The unsaturated polyester (A) mentioned above can be obtained by the reaction of dicyclopentadiene represented by the general formula (II):

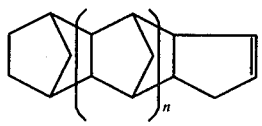

(II)

wherein, n stands for an integer of 0 to 8, and/or a dicyclopentadiene derivative with an $\alpha,\beta$-unsaturated polybasic acid or anhydride, a polyhydric alcohol, and a saturated polybasic acid or anhydride which may be used optionally.

Various methods are available for the synthesis of the unsaturated polyester. Examples are as follows:

(1) A method which involves simultaneous reaction of an α,β-unsaturated dibasic acid or anhydride, a polyhydric alcohol, the aforementioned dicyclopentadiene or derivative thereof and, optionally, a saturated dibasic acid or anhydride.

(2) A method which comprises subjecting the aforementioned dicyclopentadiene or derivative thereof and a polybasic acid to an addition reaction, adding to the resultant acid addition reaction product a polyhydric alcohol and, optionally, an α,β-unsaturated dibasic acid or anhydride and/or a saturated dibasic acid or anhydride, and thereafter subjecting the resulting mixture to esterification conditions.

(3) A method which comprises subjecting the aforementioned dicyclopentadiene or derivative thereof and a polyhydric alcohol to an addition reaction, adding to the resultant addition reaction product an α,β-unsaturated dibasic acid or anhydride and, optionally, a saturated dibasic acid or anhydride and/or a polyhydric alcohol and thereafter subjecting the resultant mixture to esterification conditions.

(4) A method which comprises subjecting the aforementioned dicyclopentadiene or derivative thereof and water to an addition reaction, adding to the resultant addition reaction product an α,β-unsaturated dibasic acid or anhydride and, optionally, a saturated dibasic acid or anhydride and/or a polyhydric alcohol and thereafter subjecting the resultant mixture to esterification conditions.

(5) A method which comprises simultaneously combining the aforementioned dicyclopentadiene or derivative thereof, maleic anhydride and water thereby causing an acid addition reaction thereof, adding to the resultant acid addition reaction product of polyhydric alcohol and, optionally, an α,β-unsaturated dibasic acid or anhydride and/or a saturate dibasic acid or anhydride, and thereafter subjecting the resultant mixture to esterification conditions.

In this case, the addition reaction product of the aforementioned dicyclopentadiene or derivative thereof with a polybasic acid and a polyhydric alcohol or water may be optionally purified as by means of distillation, for example, before it is subjected to the subsequent step of procedure.

Examples of α,β-unsaturated dibasic acids or anhydrides thereof to be used for the preparation of typical addition reaction products formed in the first steps of the methods (2) through (5) indicated above and the preparation of unsaturated polyester (A) in the methods of (1) through (5) indicated above are maleic acid, maleic anhydride, fumaric acid, and itaconic acid. Examples of saturated dibasic acids or anhydrides thereof are phthalic anhydride, isophthalic acid, terephthalic acid, tetrahydrophthalic anhydride, hexahydrophthalic anhydride, tetrachlorophthalic anhydride, Himic anhydride (proprietary product of 3,6-endomethylene-tetrahydrophthalic anhydride, produced and marketed by Hitachi Chemical Company, Ltd.) succinic acid, adipic acid, and trimetallic anhydride, and monobasic acid such as animal or vegetable oil fatty acids may used. Examples of polyhydric alcohol are ethylene glycol, diethylene glycol, triethylene glycol, propylene glycol, dipropylene glycol, butane-diol-1,3 butane-diol-1,4, butane-diol-2,3, neopentyl glycol, pentane-diol-1,5, hexane-diol-1,6,2,2,4-trimethyl pentane-diol-1,3, hydrogenated bis-phenol A, glycerol, trimethylol ethane, trimethylol propane, polybutadiene glycol and polycaprolactone, and also trans-esterificates of animal or vegetable oil may be used.

Typical addition reaction products to be formed in the first steps of the aforementioned methods (2) through (5) are tricyclodecenyl maleate, tricyclodecenyl fumarate, tricyclodecenyl itaconate, tricyclodecenyl adipate, tricyclodecenyl phthalate, trichlodecenyl isophthalate, tricyclodecenyl terephthalate, tricyclodecenyl trimellate, ethylene glycol tricyclodecenyl ether, diethylene glycol tricyclodecenyl ether, propylene glycol tricyclodecenyl ether, dipropylene glycol tricyclodecenyl ether, 1,4-butane-diol tricyclodecenyl ether, 1,6-hexane-diol tricyclodecenyl ether, neopentyl glycol tricyclodecenyl ether, glycerin tricyclodecenyl ether, trimethylol propane tricyclodecenyl ether and hydroxylated dicyclopentadiene, and preferably tricyclodecenyl maleate because of good compatibility with the dicyclopentadiene type resin.

The synthesis of the unsaturated polyester (A) to be used in the present invention is carried out by an ordinary method such as, for example, the melting methods or the solvent method, with the reaction controlled mainly with respect to the acid number. When the synthesis is made by the melting method, for example, the necessary reactants are combined and the reactant mixture is subjected to a reaction under the atmosphere of an inert gas such as carbon dioxide or nitrogen gas at a temperature within the range of from 150° to 230° C., preferably from 180° to 220° C., with the acid number kept within the range of at most 35, preferably, at most 30.

Now, the dicyclopentadiene type resin (B), which forms the second constituent of the resin composition of the present invention, containing 50 to 100% by weight of polymerized dicyclopentadiene units will be described.

Besides the homopolymer of dicyclopentadiene, examples of dicyclopentadiene type resins include copolymers of dicyclopentadiene with unsaturated hydrocarbons, unsaturated alcohols, unsaturated carboxylic acids and vinyl esters of carboxylic acids, adducts of dicyclopentadiene polymers and polar unsaturated compounds, thermal polymerization products of acid adducts of dicyclopentadiene and maleic acid and hydrogenation products of such polymers. In this case, these resins are required to contain at least 50% by weight of polymerized dicyclopentadiene units. When the content of polymerized dicyclopenthadiene units is less than 50% by weight, the improvement in the a adhesiveness of the produced resin composition falls short of the level aimed at by this invention and the improvement in the compatibility of the resin with the unsaturated polyester does not reach the level desired. Thus, any lower content of the polymerized dicyclopentadiene units proves to be improper for this invention. The content of the polymerized dicyclopentadiene units in the dicyclopentadiene type resin is calculated with respect to all the reactants combined in preparation for the synthesis of the resin composition.

The unsaturated polyester which is used in this invention is caused by a radical-generating curing agent to undergo self-polymerization and form an insoluble and infusible cured product. Thus, it does not always find any particular use for a polymerizable monomer. Generally, for the purpose of lowering the viscosity of the produced composition and facilitate the curing reaction, the polymerizable monomer (C) having at least one polymerizable double bond within the molecule thereof is additionally used as the third constituent of the composition. Examples of polymerizable monomers meeting the foregoing requirement include styrene, vinyl toluene, divinylbenzene, diallyl phthalate, vinyl acetate; alkyl acrylates such as methyl acrylate, ethyl acrylate, n-propyl acrylate, isopropyl acrylate, butyl acrylate and 2-ethylhexyl acrylate; alkyl methacrylates such as methyl methacrylate, ethyl methacrylate, isopropyl methacrylate, 2-ethylhexyl methacrylate, 2-hydroxyethyl acrylate, 2-hydroxyethyl methacrylate, 2-hydroxypropyl acrylate and 2-hydroxypropyl methacrylate; diacrylates and dimethacrylates of various polyols such as ethylene glycol diacrylate, ethylene glycol dimethacrylate, diethylene glycol dimethacrylate, propylene glycol diacrylate and glycerol dimethacrylate.

In this invention, a thermoplastic polymer having a molecular weight within the range of from 5,000 to 500,000 (D) may be optionally used. One of the objects of the addition of this thermoplastic polymer resides in lowering the shrinkage of the resin composition during the setting. Examples of thermoplastic polymers usable for this purpose include polystyrene, polyvinyl acetate, polyalkyl methacrylates and saturated polyesters formed of saturated dibasic acids and glycols. Preferably, the thermoplastic polymer thus used has a molecular weight within the range of from 15,000 to 300,000.

The proportions of the unsaturated polyester (A), dicyclopentadiene type resin (B), polymerizable monomer (C) and thermoplastic polymer (D) to be combined are desired to fall within the ranges of 30 to 90 parts by weight of (A), 2 to 30 parts by weight of (B), 0 to 60 parts by weight of (C) and 0 to 15 parts by weight of (D). Preferably they fall within the ranges of 30 to 70 parts by weight of (A), 3 to 30 parts by weight of (B), 10 to 60 parts by weight of (C) and 0 to 15 parts by weight of (D).

Further, the resin composition to be obtained by this invention may incorporate a radical-generation curing agent, a curing promoter, a polymerization inhibitor, a filler, a coloring agent, a flame retardant, a reinforcement, etc.

Examples of radical-generation curing agents include peroxide type curing agents such as methylethyl ketone peroxide, benzoyl peroxide, t-butyl benzoate, cumene hydroperoxide and dicymyl peroxide and photopolymerization curing agents such as benzoin, benzoin ethyl ether and benzophenone. Such a radical-generation curing agent is desired to be incorporated in an amount within the range of from 0.2 to 10 parts by weight per 100 parts by weight of the resin composition.

Examples of curing promoters are cobalt naphthenate, manganese napthenate, cobalt octenate and dimethyl aniline, and examples of polymerization inhibitors are hydroquinone, catechol and p-benzoquinone.

Examples of fillers are calcium carbonate, clay, hydrated alumina and silica, examples of coloring agents are various kinds of pigments and dyestuffs, examples of flame retardants are halogen containing compounds, antimonium compounds, aluminum hydroxide, red phosphorus and phosphates, and examples of reinforcements are glass fibers, vinylon fibers and carbon fibers.

Now, the present invention will be described with reference to working examples. Wherever "parts" and "percents" are mentioned, they are parts by weight and percents by weight respectively.

FORMULATION 1

A reactor fitted with a stirrer, a reflux condenser and a nitrogen feed pipe was charged with 1320 parts of dicyclopentadiene and 1160 parts of maleic acid, which were caused to react at 135° C. for three hours to form a light yellow waxy product of an acid number of 222 composed preponderantly of tricyclodecenyl maleate. This product is identified as DCPD-MA.

FORMULATION 2

A reactor fitted with a stirrer, a reflux condenser and a dripping funnel was charged with 660 parts of dicyclopentadiene and 372 parts of ethylene glycol. To the reactants which were kept at 120° C., 18 parts of boron trifluoride etherate was gradually added dropwise. After the dropwise addition, the reaction was continued for six hours. Thereafter, the reaction mixture was neutralized in 350 parts of an aqueous 10% sodium hydroxide solution and 1000 parts of benzene was added thereto. The resultant mixture was washed three times with 2000 parts of water and subsequently subjected to vacuum distillation. Consequently, there was obtained ethylene glycol tricyclodecenyl ether. This product is identified as DCPD-EG.

FORMULATION 3

A reactor similar to the reactor of Formulation 2 charged with 924 parts of dicyclopentadiene and 164 parts of water, which were treated by following the procedure of Formulation 2 to produce hydrozylated dicyclopentadiene. This product is identified as OH'ed DCPD.

FORMULATION 4

A reactor similar to the reactor of Formulation 1 was charged with 740 parts of phthalic anhydride and 750 parts of OH'ed DCPD, which were caused to react at 120° C. for five hours to form a product (acid number 190) composed preponderantly of tricyclodecenyl phthalate. This product is identified as DCPD-PA.

FORMULATION 5

The procedure of Formulation 2 was faithfully repeated, except that ethylene glycol was substituted by 456 parts of propylene glycol. Consequently, there was produced propylene glycol tricyclodecenyl ether. This product is identified as DCPD-PG.

SYNTHESIS OF UNSATURATED POLYESTER

Synthesis Nos. 1–3

In a four-necked flasks having an inner volume of 1 liter and provided with a stirrer, a partial condenser, a thermometer and a nitrogen feed pipe, unsaturated polyesters, UP-1 to UP-3, were synthesized by using the respective sets of reactants and reaction conditions shown in Table 1. The properties of the produced unsaturated polyesters are also shown in Table 1.

TABLE 1

|  | UP-1 | UP-2 | UP-3 |
|---|---|---|---|
| Reactants used (in parts) | | | |
| Tricyclodecenyl maleate | 744 | 744 | 744 |
| Ethylene glycol | 102 | — | — |
| Dipropylene glycol | — | 222 | — |
| 1,6-Hexane diol | — | — | 195 |

TABLE 1-continued

| | UP-1 | UP-2 | UP-3 |
|---|---|---|---|
| Hydroquinone | 0.085 | 0.097 | 0.094 |
| Toluene | — | 29 | — |
| Reaction conditions | | | |
| Method of synthesis | Melting | Solvent | Melting |
| Duration of temperature elevation (hrs) | 4 | 4 | 4 |
| Reaction temperature (°C.) | 205 | 215 | 210 |
| Reaction time (hrs) | 4 | 4 | 3.5 |
| Characteristic | | | |
| Acid number | 25.4 | 22.5 | 16.8 |

Synthesis No. 4

A four-necked flask, 1 liter in inner volume, similar to the flask used for the synthesis of UP-1 was charged with 196 parts of maleic anhydride, 296 parts of phthalic anhydride, and 335 parts of propylene glycol. The reactant mixture was heated to 210° C. over a period of four hours and retained at this temperature for four hours to produce an unsaturated polyester, UP-4, having an acid number of 26.1.

Synthesis No. 5

A reactor fitted with a fractionation column, a nitrogen feed pipe, a thermometer and a stirrer was charged with 116 parts of diethylene glycol and 496 parts of DCPD-MA and further charged with 0.02%, based on the total charge, of hydroquinone. Under a current of nitrogen gas, the reactant mixture was gradually heated to 210° C. over a period of three hours and caused to react at this temperature for three hours, to produce an unsaturated polyester, UP-5, having an acid number of 23.4.

Synthesis No. 6

The same reactor as used in Synthesis No. 5 was charged with 314 parts of maleic anhydride, 118 parts of phthalic anhydride, 319 parts of propylene glycol and 211 parts of dicyclopentadiene, which were caused to react at 140° C. for 3.5 hours and subsequently heated to 205° C. over a period of three hours and left to react for five hours. Consequently, there was produced an unsaturated polyester, UP-6, having an acid number of 19.8.

Synthesis No. 7

A reactor provided with a water-content analyzer incorporating a condenser, a nitrogen feed pipe, a thermometer and a stirrer was charged with 196 parts of maleic anhydride, 80 parts of propylene glycol and 388 parts of DCPD-EG and further charged with 0.02% of hydroquinone and 3% of toluene respectively based on the total amount of the charge. The reactant mixture was heated to 210° C. over a period of five hours. When the reaction was continued for three hours, the acid number reached 30.5. At this point, the reaction system was cooled to lower the reaction temperature to 190° C. and, at the same time, the reaction mixture was treated to expel toluene. Within 1.5 hours of the treatment, there was obtained an unsaturated polyester, UP-7, having an acid number of 26.4.

Synthesis No. 8

A reactor provided with a stirrer, a reflux condenser, a nitrogen feed pipe and a thermometer was charged with 264 parts of dicyclopentadiene, 196 parts of maleic anhydride and 36 parts of water, which were caused to react at 95° C. for one hour and then heated to 140° C. over a period of two hours. The reaction was continued at this temperature for one hour. After the reaction mixture was cooled, 84 parts of propylene glycol and 0.12 part of hydroquinone were added thereto. With the reflux condenser on the reactor substituted by a fractionating column, the reaction mixture was heated to 205° C. over a period of three hours and the reaction was continued for 4.5 hours. Consequently, there was obtained an unsaturated polyester, UP-8 having an acid number of 16.8.

SYNTHESIS OF DICYCLOPENTADIENE TYPE RESIN

Synthesis No. 9

A stainless steel autoclave having an inner volume of 1 liter was charged with 500 parts of dicyclopentadiene and 200 parts of xylene, which were caused to react while under agitation at 265° C. for three hours. After the reaction, the content of the autoclave was distilled to expel the unaltered monomers, low molecular-weight polymers and xylene, to produce a dicyclopentadiene type resin (identified as DCPD-1).

Synthesis No. 10

A four-necked flask provided with a stirrer, a reflux condenser, a nitrogen feed pipe and a thermometer was charged with 15 parts of aluminum chloride and 30 parts of toluene. To the mixture which was kept at 75° C. under a current of air, 400 parts of a mixture consisting of 4 parts of dicyclopentadiene and 1 part of diisobutylene was added over a period of 45 minutes. After the addition, the reaction was continued for 90 minutes. Thereafter, the reaction solution was treated with a methanol/aqua ammonia mixture to induce precipitation of the catalyst. The solution was filtered to separate the precipitated catalyst. The filtrate was distilled under a vacuum to produce a dicyclopentadiene type resin, DCPD-2.

Synthesis No. 11

A stainless steel autoclave having an inner volume of 1 liter was charged with 300 parts of dicyclopentadiene, 100 parts of vinyl acetate and 200 parts of toluene, which were caused to react while under agitation at 260° C. for five hours. After the reaction, the content of the autoclave was distilled to produce a dicyclopentadiene type resin, DCPD-3.

Synthesis No. 12

The procedure used in the synthesis of DCPD-3 was followed, except that 420 parts of dicyclopentadiene and 80 parts of allyl alcohol were used instead. Consequently, there was obtained a dicyclopentadiene type resin, DCPD-4.

Synthesis No. 13

A four-necked flask provided with a stirrer, a reflux condenser, a nitrogen feed pipe and a thermometer was charged with 300 parts of DCPD-1 and 12 parts of maleic acid, which were caused to react under a current of nitrogen gas at 210° C. for three hours, to produce a dicyclopentadiene type resin, DCPD-5.

Main properties of the dicyclopentadiene type resins obtained in Synthesis Nos. 9-13 are shown in Table 2 below.

TABLE 2

| | DCPD-1 | DCPD-2 | DCPD-3 | DCPD-4 | DCPD-5 |
|---|---|---|---|---|---|
| Yield (%) | 96 | 97 | 84 | 88 | 99 |
| Softening point (°C.) | 131 | 89 | 92 | 80 | 97 |
| Acid number | — | — | — | — | 38 |
| Hydroxyl group number | — | — | — | 148 | — |
| Iodine number | 75 | 68 | 83 | 116 | 71 |

EXAMPLES 1–7 AND CONTROLS 1–3

Resin compositions were prepared by using the unsaturated polyesters, UP-1 through UP-4, and dicyclopentadiene type resins, DCPD-1 through DCPD-5, in the varying proportions indicated in Table 3. The properties of the compositions are shown in Table 4.

The properties shown in Table 4 were rated as described below.

Compatibility: An unsaturated polyester, a dicyclopentadiene type resin and styrene were uniformly mixed. The mixture was placed in a test tube 18 mm in inside diameter to a depth of 150 mm, left standing at rest at 23° C. was placed under visual observation for determination of phase separation. The compatibility was rated on the three mark scale, wherein o stands for total absence of observable phase separation over a period of 30 days, Δ for occurrence of observable phase separation within the period of 30 days for x for occurrence of observable phase separation within seven days.

Shrinkage on setting: The shrinkage was determined by measuring the specific gravity of a sample before and after the setting in accordance with Japanese Industrial Standard (JIS) K-6901.

Adhesiveness: Two aluminum plates, 150 mm×25 mm×2 mm, polished with an abrasive paper #400 and defatted with acetone were piled one on top of the other to an overlapping width of 12.5 mm, with a given resin composition spread on the opposed surfaces of the aluminum plates and then caused to set under stated conditions. The adhesiveness of the resin composition was measured in terms of tensile shear adhesive strength by drawing the two aluminum plates in mutually separating directions.

Volume resistance coefficient: A given resin of a stated composition was allowed to set under stated conditions and molded in the form of a plate 2 mm in thickness. This test piece was tested for volume resistance coefficient in accordance with JIS K-6911.

TABLE 3

| | Example | | | | | | | Control | | |
|---|---|---|---|---|---|---|---|---|---|---|
| | 1 | 2 | 3 | 4 | 5 | 6 | 7 | 1 | 2 | 3 |
| Proportions (parts by weight) | | | | | | | | | | |
| UP-1 | 50 | 45 | | | | 70 | | | | |
| UP-2 | | | 50 | 40 | | | | 70 | | 50 |
| UP-3 | | | | | 50 | | 45 | | | |
| UP-4 | | | | | | | | | 45 | |
| DCPD-1 | 15 | | | | | | | | 20 | |
| DCPD-2 | | | | | | 15 | 10 | | | |
| DCPD-3 | | | 20 | | | | | | | |
| DCPD-4 | | 20 | | | | | 15 | | | |
| DCPD-5 | | | | 25 | 30 | | | | | |
| C$_9$ type petroleum resin[1] | | | | | | | | | | |
| styrene | 35 | 35 | 30 | 35 | 35 | — | 30 | 30 | 35 | 30 |
| Setting conditions | | | | | | | | | | |
| Cobalt octenate[2] | 0.5 | — | 0.5 | — | 0.5 | — | 0.5 | 0.5 | 0.5 | 0.5 |
| Methylethyl ketone peroxide[3] | 1.0 | — | 1.0 | — | 1.0 | — | 1.0 | 1.0 | 1.0 | 1.0 |
| Benzoyl peroxide[4] | — | 2.0 | — | 2.0 | — | — | — | — | — | — |
| Dicymyl peroxide | — | — | — | — | — | 1 | — | — | — | — |
| Setting temperature (°C.) | 25 | 80 | 25 | 80 | 25 | 150 | 25 | 25 | 25 | 25 |
| Setting time (hrs) | 48 | 3 | 48 | 3 | 48 | 3 | 48 | 48 | 48 | 48 |

[1]C$_9$ type petroleum resin (made by Nihon Oil Co., and marketed under trademark designation of Nisseiki Neopolymer-120)
[2]cobalt content 6%
[3]55% solution
[4]50% paste

TABLE 4

| | Example | | | | | | | Control | | |
|---|---|---|---|---|---|---|---|---|---|---|
| | 1 | 2 | 3 | 4 | 5 | 6 | 7 | 1 | 2 | 3 |
| Characteristic of unset product | | | | | | | | | | |
| Compatibility | o | o | o | o | o | o | o | o | o | Δ |
| Properties of set product | | | | | | | | | | |
| Shrinkage on setting (%) | 5.7 | 4.5 | 4.5 | 4.2 | 6.1 | 1.4 | 5.1 | 8.0 | 5.9 | 5.1 |
| Adhesive strength (kg . f/cm$^2$) | 72 | 100 | 102 | 95 | 83 | 135 | 118 | 46 | 28 | 43 |
| Volume resistance coefficient* (Ω . cm) | $3 \times 10^{15}$ | $4 \times 10^{14}$ | $6 \times 10^{14}$ | $1 \times 10^{15}$ | $9 \times 10^{14}$ | $1 \times 10^{14}$ | $5 \times 10^{14}$ | $3 \times 10^{14}$ | $2 \times 10^{12}$ | $4 \times 10^{14}$ |

*Measured at 120° C.

EXAMPLES 8–11 AND CONTROLS 4–5

Resin compositions were prepared by using the unsaturated polyesters, UP-5 to UP-8, obtained in Synthesis Nos. 5-8 and the dicyclopentadiene type resins, DCPD-1 to DCPD-5, obtained in Synthesis Nos. 9-13, in the proportions shown in Table 5. The properties of these resin composition are shown in Table 6. The properties indicated in Table 6 were rated by the methods described above.

TABLE 5

|  | Example | | | | Control | |
|---|---|---|---|---|---|---|
|  | 8 | 9 | 10 | 11 | 4 | 5 |
| Proportions | | | | | | |
| UP-5 | 50 | | | 55 | | 50 |
| UP-6 | | 45 | | | 60 | |
| UP-7 | | | 50 | | | |
| DCPD-1 | | | | 15 | | |
| DCPD-3 | 20 | | | | | |
| DCPD-4 | | | 20 | | | |
| DCPD-5 | | 15 | | | | |
| C9 type petroleum[1] resin | | | | | | 20 |
| Styrene | 30 | 40 | 30 | 30 | 40 | 30 |
| Setting conditions | | | | | | |
| Cobalt octenate[2] | 0.5 | | 0.5 | | | 0.5 |
| Methylethyl ketone peroxide[3] | 1.0 | | 1.0 | | | 1.0 |
| Benzoyl peroxide[4] | | 2.0 | | 2.0 | 2.0 | |
| Setting temperature (°C.) | 25 | 80 | 25 | 80 | 80 | 25 |
| Setting time (hrs) | 48 | 3 | 48 | 3 | 3 | 48 |

[1]C9 type petroleum resin (made by Nihon Oil Co., and marketed under trademark designation of Nisseki Neopolymer 120)
[2]Cobalt content 6%
[3]55% solution
[4]50% paste

TABLE 6

|  | Example | | | | Control | |
|---|---|---|---|---|---|---|
|  | 8 | 9 | 10 | 11 | 4 | 5 |
| Characteristic of Unset product | | | | | | |
| Compatibility | o | o | o | o | o | Δ |
| Properties of set product | | | | | | |
| Shrinkage on setting (%) | 4.9 | 5.7 | 4.8 | 4.5 | 7.8 | 6.4 |
| Adhesive strength (kg . f/cm²) | 96 | 75 | 110 | 88 | 33 | 42 |
| Volume resistance coefficient* (Ω . cm) | $5 \times 10^{14}$ | $7 \times 10^{14}$ | $2 \times 10^{14}$ | $5 \times 10^{15}$ | $8 \times 10^{14}$ | $1 \times 10^{15}$ |

*Measured at 120° C.

EXAMPLES 12-14 AND CONTROL 6

By following the procedure of Examples 8-11, resin compositions were prepared by using varying constituents in varying proportions indicated in Table 7. (The numerical values represent proportions in parts by weight.) The properties of these resin compositions are shown in Table 8. The properties were rated by the methods described above.

TABLE 7

|  | Example | | | Control |
|---|---|---|---|---|
|  | 12 | 13 | 14 | 6 |
| Proportions | | | | |
| UP-5 | 42 | 42 | | |
| UP-6 | | | 40 | |
| UP-7[1] | | | | 40 |
| DCPD-2 | 8 | | | |
| DCPD-3 | | 8 | | 8 |
| DCPD-5 | | | 8 | |

TABLE 7-continued

|  | Example | | | Control |
|---|---|---|---|---|
|  | 12 | 13 | 14 | 6 |
| Polystyrene | 5 | | | |
| Polyvinyl acetate | | 5 | 5 | 5 |
| Styrene | 45 | 45 | 47 | 47 |
| Setting Conditions | | | | |
| Cobalt octenate | 0.5 | | | |
| Methylethyl ketone peroxide | 1.0 | | | |
| Benzoyl peroxide | | 2.0 | 2.0 | 2.0 |
| Setting temperature (°C.) | 25 | 80 | 100 | 80 |
| Setting time (hrs) | 48 | 3 | 2 | 3 |

[1]Unsaturated polyester (acid number 28.2) obtained from 343 parts of maleic anhydride, 222 parts of phthalic anhydride and 418 parts of propylene glycol.
[2]Cobalt content 6%
[3]55% solution
[4]50% paste

TABLE 8

|  | Example | | | Control |
|---|---|---|---|---|
|  | 12 | 13 | 14 | 6 |
| Characteristic of unset product | | | | |
| Compatibility | o | o | o | x |
| Properties of set product | | | | |
| Shrinkage on setting (%) | 3.9 | 2.8 | 4.5 | 5.6 |
| Adhesive strength (kg . f/cm²) | 73 | 115 | 85 | 18 |
| Volume resistance coefficient* (Ω . cm) | $1 \times 10^{16}$ | $3 \times 10^{14}$ | $9 \times 10^{13}$ | $8 \times 10^{11}$ |

*Measured at 120° C.

It is clear from the working examples cited above that the highly adhesive resin compositions produced in accordance with this invention set with moderate shrinkage, exhibit much higher adhesiveness than known unsaturated polyester resins and excel in electrical properties, particularly volume resistance coefficient.

The resin compositions of the present invention, therefore, are useful as agents for impregnating electrical appliances or giving them a casting treatment, and also useful in paints and adhesive agents.

We claim:

1. A setting resin composition, comprising:
   (A) an unsaturated polyester having at least 30% of all the terminal groups thereof sealed each with a group represented by the general formula (I):

(I)

wherein, n stands for an integer of 0 to 8, in admixture with
   (B) added dicyclopentadiene type resin containing 50 to 100% by weight of polymerized dicyclopentadiene units.

2. A resin composition set forth in claim 1, wherein the unsaturated polyester (A) is an unsaturated polyester obtained by reacting tricyclodecenyl maleate with a poly basic alcohol.

3. A resin composition set forth in claim 1, wherein the unsaturated polyester (A) accounts for a proportion within the range of from 30 to 90 parts by weight and the dicyclopentadiene type resin (B) for a proportion within the range of from 2 to 30 parts by weight.

4. A resin composition set forth in claim 1, wherein n is 0.

5. A resin composition set forth in claim 3, wherein the unsaturated polyester (A) accounts for a proportion within the range of from 30 to 70 parts by weight and the dicyclopentadiene type resin (B) for a proportion within the range of from 3 to 30 parts by weight.

6. A resin composition set forth in claim 1, which further comprises (C) at least one polymerizable monomer having at least one polymerizable double bond within the molecule thereof.

7. A resin composition set forth in claim 6, wherein the unsaturated polyester (A) accounts for a proportion within the range of from 30 to 90 parts by weight, the dicyclopentadiene type resin (B) for a proportion within the range of from 2 to 30 parts by weight, and the at least one polymerizable monomer having at least one polymerizable double bond within the molecule thereof (C) for a proportion within the range of from an effective amount to 60 parts by weight.

8. A resin composition set forth in claim 6, wherein n is 0.

9. A resin composition set forth in claim 7, wherein the unsaturated polyester (A) accounts for a proportion within the range of from 30 to 70 parts by weight, the dicyclopentadiene type resin (B) for a proportion within the range of from 3 to 30 parts by weight and the polymerizable monomer (C) for a proportion within the range of from 10 to 60 parts by weight.

10. A resin composition set forth in claim 6, which further comprises (D) a thermoplastic polymer having a molecular weight within the range of from 5,000 to 500,000.

11. A resin composition set forth in claim 10, wherein the unsaturated polyester (A) accounts for a proportion within the range of from 30 to 90 parts by weight, the dicyclopentadiene type resin (B) for a proportion within the range of from 2 to 30 parts by weight, the polymerizable monomer (C) for a proportion within the range of from an effective amount to 60 parts by weight and the thermoplastic polymer (D) for a proportion within the range of from an effective amount to 15 parts by weight said effective amount of the (D) being effective for lowering the shrinkage of the composition during setting.

12. A resin composition set forth in claim 10, wherein n is 0.

13. A resin composition set forth in claim 11, wherein the unsaturated polyester (A) accounts for a proportion within the range of from 30 to 70 parts by weight, the dicyclopentadiene type resin (B) for a proportion within the range of from 3 to 30 parts by weight, the polymerizable monomer (C) for a proportion within the range of from 2 to 60 parts by weight and the thermoplastic polymer (D) for a proportion within the range of from an effective amount to 15 parts by weight said effective amount of the (D) being effective for lowering the shrinkage of the composition during setting.

14. A resin composition set forth in claim 10, wherein the molecular weight of the thermoplastic polymer (D) falls within the range of from 15,000 to 300,000.

15. A resin composition set forth in claim 10, wherein the thermoplastic polymer (D) is at least one member selected from the group consisting of polystyrene, polyvinyl acetate, polyalkyl methacrylates and saturated polyesters.

16. A resin composition set forth in claim 15, wherein the thermoplastic polymer (D) is at least one member selected from the group consisting of polystyrene and polyvinyl acetate.

* * * * *

UNITED STATES PATENT AND TRADEMARK OFFICE
CERTIFICATE OF CORRECTION

PATENT NO. : 4,367,314
DATED : January 4, 1983
INVENTOR(S) : Akira Kageyama et al.

It is certified that error appears in the above-identified patent and that said Letters Patent is hereby corrected as shown below:

[56] 4,233,423 - should read "4,233,432"

Col. 1, line 52: "object" - should read —objects—

Col. 1, line 57: "the skeleton are" - should read —the skeleton is—

Col. 3, line 38: "of polyhydric" - should read —a polyhydric—

Col. 3, line 63: "trimetallic" - should read —trimellitic—

Col. 6, line 55: "flasks" - should read —flask—

Col 10, Table 3: $C_9$ type petroleum resin$^{(1)}$
item under Control 3 omitted - item under Control 3 should read —20—

Col 11, line 4: "composition" - should be —compositions—

Signed and Sealed this

Twenty-fourth Day of May 1983

[SEAL]

Attest:

DONALD J. QUIGG

Attesting Officer     Acting Commissioner of Patents and Trademarks